United States Patent
Kaneko et al.

(10) Patent No.: US 6,817,104 B2
(45) Date of Patent: Nov. 16, 2004

(54) X-Y STAGE APPARATUS

(75) Inventors: Makoto Kaneko, Tokyo (JP); Hiroshi Morita, Yokosuka (JP); Yasuhito Nakamori, Tokorozawa (JP); Masanobu Sugimine, Saitama (JP); Yoshiyuki Tomita, Hiratsuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/144,750

(22) Filed: May 15, 2002

(65) Prior Publication Data

US 2003/0213135 A1 Nov. 20, 2003

(51) Int. Cl.[7] .............................. B23Q 16/00; G01B 5/00
(52) U.S. Cl. ............................. 33/1 M; 33/568; 33/573
(58) Field of Search ........................ 33/1 M, 658, 573, 33/568, 613, 577, 569

(56) References Cited

U.S. PATENT DOCUMENTS

| | | | | |
|---|---|---|---|---|
| 4,559,717 A | * | 12/1985 | Scire et al. .................... | 33/568 |
| 4,565,094 A | * | 1/1986 | Sedgewick ................... | 33/568 |
| 4,667,415 A | * | 5/1987 | Barsky ......................... | 33/568 |
| 5,280,677 A | * | 1/1994 | Kubo et al. .................... | 33/568 |
| 5,360,974 A | * | 11/1994 | Hammond et al. ........... | 33/568 |
| 5,806,193 A | * | 9/1998 | Ebihara ....................... | 33/1 M |
| 6,328,510 B1 | * | 12/2001 | Hanrath et al. .............. | 33/1 M |
| 6,434,840 B1 | * | 8/2002 | Jourtchenko et al. ........ | 33/1 M |
| 6,467,761 B1 | * | 10/2002 | Amatucci et al. ............ | 33/1 M |

FOREIGN PATENT DOCUMENTS

JP 3042474 3/2000

* cited by examiner

*Primary Examiner*—Diego Gutierrez
*Assistant Examiner*—Yaritza Guadalupe
(74) *Attorney, Agent, or Firm*—Arent Fox PLLC

(57) ABSTRACT

The speed and precision in positioning a moving table in the X-axis and Y-axis directions is enhanced dramatically. An X-Y stage apparatus is provided, in which a moving table is supported relative to a stationary base, with slight displacements made possible within the XY plane, and in which a component mounted and placed on the moving table can be positioned within the XY plane. The X-Y stage apparatus includes an elastic hinge that is flexible only in one or two direction among the X-axis, Y-axis, and Z-axis directions, and rigid in directions of the other axes. The moving table is supported relative to the stationary base with slight displacements made possible in the XY plane, using an elastic deformation of each of the elastic hinges in the flexible direction. Furthermore, the moving table can be slightly displaced within the XY plane, using an X-axis linear motor, and a Y-axis linear motor.

6 Claims, 13 Drawing Sheets

X-Y STAGE APPARATUS

BACKGROUND OF THE INVENTION

1. Field of the Invention

The present invention relates to an X-Y stage apparatus provided with a moving table that can move within an XY plane, and which can position a component mounted on top of the moving table within the XY plane.

2. Description of the Related Art

In the past, this type of X-Y stage apparatus has been used in many industrial fields, such as mounting apparatuses of electronic components (chip mounter) machine tools, and controlling mechanism of optical systems (lens, mirrors, and others).

FIG. 15 shows a conventional X-Y stage apparatus 900. This X-Y stage apparatus 900 has a Y-axis guiding mechanism 906 with an X-Y table 907, mounted on top of an X-axis table (not shown) of an X-axis guiding mechanism 903. The X-axis guiding mechanism 903 is provided with an X-axis ball screw 902 arranged in an X-axis direction, and an X-axis servomotor 901 that rotates and drives this X-axis ball screw 902. The whole Y-axis guiding mechanism 906 is moved and positioned in the X-axis direction by controlling this X-axis servomotor 901, as appropriate. The Y-axis guiding mechanism 906 is provided with a Y-axis ball screw 905 arranged in a Y-axis direction, and a Y-axis servomotor 904 that rotates and drives this Y-axis ball screw 905. The X-Y table 907 is moved and positioned in the Y-axis direction by controlling this Y-axis servomotor 904, as appropriate. Therefore, the location of the X-Y table 907 can be positioned in the X-axis and Y-axis directions by controlling the X-axis and Y-axis servomotors 901 and 904.

For controlling methods of the X-axis and Y-axis servomotors 901 and 904, there is for example, a semi-closed-loop control method that surmises the amount of movement of the X-Y table 907 from the rotating amount of the X-axis and Y-axis ball screws 902 and 905, which is measured by encoders, and controls the X-axis and Y-axis servomotors 901 and 904 with these surmised values. There is also a fully-closed-loop control method that directly measures the amount of movement of the X-Y table 907 with a linear gauge or the like, and feedback controls the X-axis and Y-axis servomotors 901 and 904 with these values.

In recent years, the demand for "high-speed control" and "precision control" of an X-Y table 907 has been enhanced, corresponding with the advancement in technology. When trying to accomplish high-speed control, there was a limit in making the control speed faster with a driving method using a shaft mechanism with ball screws 902 and 905, because vibration increased, for example, when changing between normal rotation and reverse rotation, or when accelerating or decelerating rapidly. When trying to accomplish precision control with the semi-closed-loop control method, it was difficult to control the X-Y table 907 with precision, because there were no considerations for a bending of each of the ball screws 902 and 905, or for backlashes, or the like.

It was possible to achieve a more precise control with the fully-closed-loop control method, but the position measuring signals of the X-Y table 907 became unstable, because the vibration of each of the ball screws 902 and 905 was transmitted to the X-Y table 907, when the controlling speed went up. As a result, there was a problem that the responsiveness of the feedback control could not be enhanced, what with the signal becoming unstable.

Furthermore, since the X-Y stage apparatus 900 had a two-tiered construction, with the Y-axis guiding mechanism 906 mounted on top of the X-axis guiding mechanism 903, the center of gravity was high, and an overturning moment was prone to be generated. As a result, positioning error increased because a swing of the X-Y table 907 was generated, when controlling a rapid acceleration or deceleration. In the case of such two-tiered construction, the whole Y-axis guiding mechanism 906 becomes a moving load (inertia-load) for the X-axis guiding mechanism 903 located at the bottom tier, but only the X-Y table 907 becomes the moving load for the Y-axis guiding mechanism 906. Hence, there was a difference in the responsiveness of control in the X-axis direction, and the control in the Y-axis direction. When driving the X-Y table 907 in both of the X-axis and the Y-axis directions at the same time, as in drawing a circle, or moving in a diagonal direction of the X-Y axes, for example, there arose a problem that precision deteriorated, and it was difficult to realize high-speed control.

SUMMARY OF THE INVENTION

The present invention was made in view of the above-mentioned problems, and it is an object of this invention to achieve an X-Y stage apparatus compact in constitution, and which can control with high-speed, and with high-precision.

This invention achieves the above-mentioned objects by providing an X-Y stage apparatus comprising a stationary base, and a moving table that can be displaced within an XY plane relative to the stationary base, provided that an X-axis, a Y-axis, and a Z-axis are at right angles to each other. The X-Y stage apparatus is provided with a plurality of elastic hinges of one or more types, which have flexible characteristics only in one or two directions among the X-axis, Y-axis, and Z-axis directions, and rigid characteristics in the other directions. The elastic hinges are arranged along one direction among the X-axis, Y-axis, and Z-axis directions, and allows relative displacement between members connected to both sides of the hinges only in the flexible direction. The moving table is supported within the XY plane relative to the stationary base with slight displacement made possible by utilizing an elastic deformation of each of the elastic hinges in the aforementioned flexible direction. Moreover, the X-Y stage apparatus is provided with an X-axis linear motor which has a stator portion and a moving portion arranged on the stationary base and the moving table, respectively, and which can move the moving table in the X-axis direction, relative to the stationary base. The X-Y stage apparatus is also provided with a Y-axis linear motor which has a stator portion and a moving portion arranged on the stationary base and the moving table, respectively, and which can move the moving table in the Y-axis direction relative to the stationary base. In this constitution, the moving table is displaced slightly within the XY plane relative to the stationary base by the X-axis and Y-axis linear motors.

In this X-Y stage apparatus, the inventor of this invention adopted a constitution provided with an "elastic hinge" that supports the moving table in a movable state in the X-Y axis direction, and a "linear motor" that drives the moving table.

The basic construction of the elastic hinge itself is publicly known, and in general, has characteristics being flexible only in one particular direction and rigid in the other directions, and has a function that allows relative displacement only in the aforementioned flexible direction between members connected to both sides thereof. Assume the case of an elastic hinge having flexible characteristics only in the X-axis direction and rigid characteristics in the Y-axis and Z-axis directions, and which allows relative displacement only in the X-axis direction between members connected to both sides thereof, when it is arranged along the Y-axis direction in the XY plane. In this case, for example, it is possible to move a movable member in the X-axis direction relative to a fixed-member with the elastic deformation of the elastic hinge. On the other hand, this elastic hinge hardly allows a relative movement in the Y-axis and Z-axis directions. In other words, the elastic hinge is made so that it can "guide" the movable member in the X-axis direction.

Furthermore, for example, when a rod-formed elastic hinge that has characteristics of being flexible in the bending direction and rigid in the axial direction is arranged with its axis coinciding with the Z-axis direction, a relative displacement within the XY plane between members connected to both sides of the hinge can be allowed.

When the moving table is made to be supported in a movable state within the XY plane utilizing such elastic hinges, it is possible to make it more compact, and with low cost, because complicated guiding mechanisms such as in conventional methods become unnecessary. It is also possible to make the inertia load of driving means that drives the moving table smaller, and achieve a drive control with good responsiveness and high precision, because the construction of members around the moving table (members that are driven with the moving table) can be made simple.

In this invention, the moving table supported through the intervention of such elastic hinges is made to be driven by a linear motor. This is because the following "synergy effects" can be achieved by combining these.

The linear motor adopted as a driving apparatus in this invention has a stator and a movable element installed directly between the stationary base and the moving table, and has characteristics in which it can directly drive a relative member with the thrust of the magnetic force in "non-contact state", and this enables to achieve a high-speed and high-precision control. Therefore, it is possible to drive the moving table in one direction (the X-axis direction, for example), and also "allow" a movement of the moving table in an orthogonal direction to that direction (the Y-axis direction, for example), because the linear motor is a non-contact type. The inertia load is significantly reduced, and it is possible to lower the center of gravity, because there is no need to mount a Y-axis-direction driving apparatus on top of an X-axis-direction driving apparatus, as in the driving-mechanisms such as a ball screw.

There is of course a possibility of an "slight deviation (slide component)" generating in displacing the moving table, because a change in the longitudinal dimension of the elastic hinge is prone to occur, when the elastic hinge is elastically deformed. But this deviation can be tolerated in linear motors, and the margin of error of this "deviation" can be compensated by the control of the linear motor if necessary.

Therefore, an,extremely high-speed and high-precision positioning within the XY plane is made possible, because the elastic hinges and the linear motors are combined under a rational philosophy.

This elastic hinge is also characterized in that the reaction force (restoring force) generated corresponding to the displacement of the moving table has "linearity" (or characteristic close to linearity). Generally, the amount of displacement of the moving table can be calculated easily from the amount of rotation or the like when using mechanical driving means such as ball screws. However, with linear-motors that drive with magnetic force, a fully-closed-loop control is usually adopted, which controls by directly measuring the amount of displacement of the moving table. Therefore, when there is a big non-linear movement in the guiding mechanism, the control tend to be complicated and affects the responsiveness, or the like. However, since it has been constituted to have characteristics which is nearly equal to linearity, as mentioned above, it has become easy to control with the feedback of the X-axis and Y-axis direction measurement values of the moving table, and a high-speed and high-precision positioning (position compensation) has become possible.

As a result, a positioning control with an excellent responsiveness is available, when the driving forces of the respective linear motors and the above-mentioned restoring forces are combined rationally. If necessary, it is possible to slightly vibrate or oscillate-and-rotate components arranged and installed on top of the moving table (these movements can be conceived as a high-speed and cyclic positioning control). This is a result of a fusion between the characteristics of the linear motors being capable of changing the direction of the thrust force between normal and reverse at high-speed (electrically), and the characteristics of the restoring force being "linear".

When trying to conduct such slight and precise control with the intervention of ball screws or bearings, for example, there was a problem in that a repeated stress was affected upon a limited portion (particular portion) of these ball screws or the like, and fatigue was generated upon this limited portion to lower the lifespan. However with this elastic hinge, it is possible to exert stable controlling characteristics for a long period of time, because rolling fatigue does not generate in this elastic hinge, structurally.

It is also possible, if necessary, to omit an action (control) to return the moving table to a neutral position, because the moving table tries to automatically return to the neutral position with the restoring force of the elastic hinge, when each of the linear motors have their power turn off, for example. This is because a non-contact type linear motor becomes free in relation to the moving table, when the power of the linear motor is turned off and the thrust force is freed. This is different from the mechanical types such as the ball screw, or the like.

There is no particular limit in the number or shape of the above-mentioned intermediate member or elastic hinge. These can be arranged as appropriate, corresponding to necessity. For example, the following constitution can be adopted. In this constitution, there are provided a plurality of first elastic hinges that has flexible characteristics only in the X-axis direction, and rigid characteristics in the Y-axis and Z-axis directions, and allows relative displacement only in the X-axis direction between members connected to both ends of the first elastic hinge by being arranged along the Y-axis direction within the aforementioned XY plane. Also provided are a plurality of second elastic hinges that has flexible characteristics only in the Y-axis direction, and rigid characteristics in the X-axis and Z-axis directions, and allows relative displacement only in the Y-axis direction between members connected to both ends of the second elastic hinge by being arranged along the X-axis direction within the aforementioned XY plane. In this constitution, the stationary base, the intermediate member, and the moving table are connected with each other by combined use of the first and the second elastic hinges in such a manner that the moving table to be displaced slightly and the stationary base are arranged at a location including the XY plane, and the intermediate member is interposed within the aforementioned XY plane in-between the stationary base and the moving table, so that the moving table is slightly movable within the XY plane relative to the stationary base, and supported at a prescribed location with regard to the Z-axis direction.

When the intermediate member is interposed between the stationary base and the moving table within the XY plane, and all three of them are linked together through the intervention of the first and second elastic hinges, it becomes possible for the moving table to be "guided" and moved linearly in both the X-axis and the Y-axis directions relative to the stationary base, because the intermediate member comes to maintain a fixed state with regard to the direction in which the first and second elastic hinges are made rigid. Thereby, a control with excellent responsiveness and stability can be achieved, because there is intrinsically no backlash, slips or roll.

In this case, it may be constituted as follows: the intermediate member is formed into a rectangular ring-shape having two extended portion in the X-axis direction, and two extended portion in the Y-axis direction; provision of the plurality of the first elastic hinges arranged in the Y-axis direction between the two extended portion in the X-axis direction of the intermediate member and the stationary base allows the relative displacement between the stationary base and the intermediate member in the X-axis direction; provision of the plurality of the second elastic hinges arranged in the X-axis direction between the two extended portion in the Y-axis direction of the intermediate member and the moving table allows the relative displacement between the intermediate member and the moving table in the Y-axis direction. This constitution is easy to design because the construction is simple, and it is possible to easily arrange each of the elastic hinges in a line symmetrical manner with regard to the X-axis and Y-axis directions, because elastic hinges are arranged and installed on each of the total of four extended portions (that is, on each of the sides of the ring). As a result, it is possible to suppress an occurrence of a phenomenon in which the intermediate member itself rotates around the Z-axis. Hence, a positioning with high precision is possible.

By constituting the intermediate member in such a ring-shape, the rigidity of the intermediate member itself is increased also, suppressing an elastic deformation of the intermediate member itself, and the precision of the positioning is improved.

However, in this invention, the constitution of the intermediate member is not limited to the above-mentioned constitution. The following constitution can be adopted for the intermediate member other than the constitution of forming it into a rectangular ring-shape. Namely, for example, the intermediate member is divided into a plurality of intermediate members including a first intermediate member and a second intermediate member. In this constitution, the relative displacement of the moving table in the X-axis and Y-axis directions relative to the stationary base is allowed by arranging the first elastic hinge between the stationary base and the first intermediate member to allow the relative displacement between both members in the X-axis direction, and by arranging the second elastic hinge between the first intermediate member and the moving table to allow the relative displacement between both members in the Y-axis direction. On the other hand, the displacement of the moving table in the X-axis and Y-axis directions relative to the stationary base is allowed by arranging the second elastic hinge between the stationary base and the second intermediate member to allow the relative displacement between both members in the Y-axis direction, and by arranging the first elastic hinge between the second intermediate member and the moving table to allow the relative displacement between both members in the X-axis direction.

In this case, the divided first and second intermediate members, including the aforementioned first elastic hinges and the second elastic hinges linked together to the first and second intermediate members, should be arranged so that they are point-symmetric with regard to the center of the moving table.

For example, when the above-mentioned ring-shaped construction is adopted as the construction for the intermediate member, the inertia load in one of the directions is almost equal to "moving table+ring-shaped intermediate member", whereas the inertia load in the other direction is almost equal to only the "moving table". Therefore, it is inevitable that the inertia load in the X-axis and Y-axis directions differ to some extent (although with much less effects compared to constructions using conventional guide mechanisms).

However, it is possible to make the inertia load in the X-axis and Y-axis directions uniform, by dividing the intermediate member, and arranging the first elastic hinges and the second elastic hinges so that they are point-symmetric with regard to the center of the moving table, for example. By doing so, it is possible to have a positioning control balanced in both directions.

In other words, in this constitution having the intermediate member divided, the elastic deformation of the first elastic hinge of each of the first and second intermediate members in the X-axis direction contributes to the relative movement of the moving table in the X-axis direction to the stationary base. Also, the elastic deformation of the second elastic hinge of each of the first and second intermediate members in the Y-axis direction contributes to the relative movement of the moving table in the Y-axis direction to the stationary base. Therefore, when driving the moving table in the X-axis direction, the inertia load will become approximately "moving table+first intermediate member" (ignoring the components mounted on the moving table), and when moving the moving table in the Y-axis direction, the inertia load will become approximately "moving table+second intermediate member". As a result, it is possible to make the inertia load in the X-axis and Y-axis directions uniform, by making the number of the first intermediate members and the second intermediate members the same, or making their weights equal, for example. By doing so, it is possible to have a balanced positioning control in both of the directions.

This point-symmetric support cannot be implemented with a construction provided with a single intermediate member. It can be achieved only with a constitution that has the intermediate member divided into a plurality of intermediate members, and in which both the first and second elastic hinges exist between the stationary base and the plurality of intermediate members, and both the first and second elastic hinges exist between the plurality of intermediate members and the moving table.

In the above constitution, the elastic hinges were limited to being arranged in the X-axis or Y-axis direction. However, as apparent from the above-mentioned view, the compatibility between the "elastic hinge" and the "linear motor" is extremely good, and similar effects are possible with the following constitution.

This invention achieves the above-mentioned objects by providing an X-Y stage apparatus comprising a stationary base, and a moving table that can be displaced within an XY plane relative to the stationary base, provided that an X-axis, a Y-axis, and a Z-axis are at right angles to each other. The stationary base is arranged with a prescribed clearance spaced in the Z-axis direction with regard to the moving table. The X-Y stage apparatus is provided with at least three elastic hinges in the Z-axis direction that has rigid characteristics only in its longitudinal direction, and which is arranged and interposed in the clearance along the Z-axis direction, and which slightly displaces the moving table in the XY plane relative to the stationary base by elastic deformation of the hinges. Moreover, the X-Y stage apparatus is provided with an X-axis linear motor which has a stator portion and a moving portion arranged on the stationary base and the moving table, respectively, and which can move the moving table in the X-axis direction, relative to the stationary base. The X-Y stage apparatus is also provided with a Y-axis linear motor which has a stator portion and a moving portion arranged on the stationary base and the moving table, respectively, and which can move the moving table in the Y-axis direction relative to the stationary base. In this constitution, the moving table is displaced slightly within the XY plane relative to the stationary base by the X-axis and Y-axis linear motors.

In this X-Y stage apparatus, a constitution is adopted in which the moving table is, supported by elastic hinges in the Z-axis direction. This constitution has each of the elastic hinges elastically deformable in both the X-axis and Y-axis directions, and moves the moving table within the XY plane relative to the stationary base.

This kind of elastic hinge in the Z-axis direction cannot guide the moving table "linearly" in the X-axis or Y-axis direction, structurally. However in this case, the X-axis and Y-axis linear motors are used as the drive source, which can produce a linear thrust force. Therefore, an effective control is possible in combination with the elastic hinges in the Z-axis direction, because each of the linear motors can also serve as a "non-contact linear guide." In other words, each of the linear motors serves as a "driver", and also as a "guide (regulator)."

As a result, it is possible to position the movement of the moving table in the XY plane with high speed and high precision by using the X-axis and Y-axis linear motors. It is also possible to reduce manufacturing cost due to its simple constitution with the elastic hinges in the Z-axis direction supporting the moving table.

It is preferred that three elastic hinges are installed, so that they are positioned at the corresponding positions with the respective apex locations of a virtual equilateral triangle within the XY plane, whose center of the gravity coincides with the center of the gravity of the moving table.

There is no particular limitation in the number of the X-axis and Y-axis linear motors. For example, when two X-axis linear motors are arranged and installed with a prescribed interval in the Y-axis direction, a correction of the location in the Z-axis rotating direction is made possible by the difference in the amount of displacement of each of the two linear motors. The Y-axis linear motor can be arranged and installed similarly, as a matter of course. It is also possible to arrange three or more linear motors in each of the directions.

In this invention, there is no particular limitation in the specific constitution of the elastic hinge. However, the following constitution is conceivable for an elastic hinge that reduces stress concentration to a minimum.

That is, a constitution provided with a bridge member connecting the two members, and having an easily deformable reduced-thickness portion formed by forming notches at a plurality of positions separated in a longitudinal direction of the bridge member on an outer circumference surface of the bridge member, in which the depth of the notch in a radius direction of the bridge member is configured to be smaller than half of L, L being the length of the notch in an axial direction of the bridge member.

In this regard, the depth of the notch F1 was configured to be exactly half of L1 (in a concept of comparing with this invention), where L1 was the length of the notch, because the shape of the notch was made a "semicircle", in conventional elastic hinges.

In contrast, when suppressing the depth of the notch to be smaller than half the length of the notch, the generated maximum stress can be reduced in comparison to conventional elastic hinges.

Various specific constitutions can be conceived, to configure the depth smaller than half the length of the notch L.

For example, the notch can be formed to provide a notched cross section with an outline of a circular-arc smaller than a semicircle.

Alternatively, the notch can be formed to provide a notched cross section with an outline of an ellipse-arc.

By doing so, it is possible to ease the concentration of stress, and reduce maximum stress, because the curve of the notch can be made milder.

When a parallel portion, with unchanged cross section for a prescribed length in the longitudinal direction of the notch, is provided in the minimum cross section portion at the center of the longitudinal direction of the notch, the thinnest portion of the reduced thickness portion can be made to be broader than conventional ones. In other words, the portion that receives stress can be made a plane, as opposed to the line portion in conventional hinges. Consequently, the stress can be dispersed to a broad range, and the maximum stress exerted upon the elastic hinge can be reduced.

In this case, when the bridge member is formed to have a rectangular cross section, and the notches are formed symmetrically on two opposing outer side faces facing towards the bending and deforming direction, the thinning is done only in one direction. Hence, it becomes easy to bend only in the direction that had the portion thinned, and maintains a state in which it is difficult to bend in the other directions. Therefore, an elastic hinge with bending directionality is realized. In particular, a balanced bending deformation can be achieved due to the reduced thickness portion located at the center portion in the thickness direction of the bridge member by providing symmetrical notches arranged on two outer side faces.

It is also possible to form the bridge member to have a circular cross section, and have the notch formed in annular form around the whole circumference of the bridge member. In this constitution, an elastic hinge is realized, which is easy to bend in all directions, with no bending directionality.

DETAILED DESCRIPTION OF THE PREFERRED EMBODIMENTS

Embodiments of the present invention will be described in detail, with references to the drawings.

Figure 1:
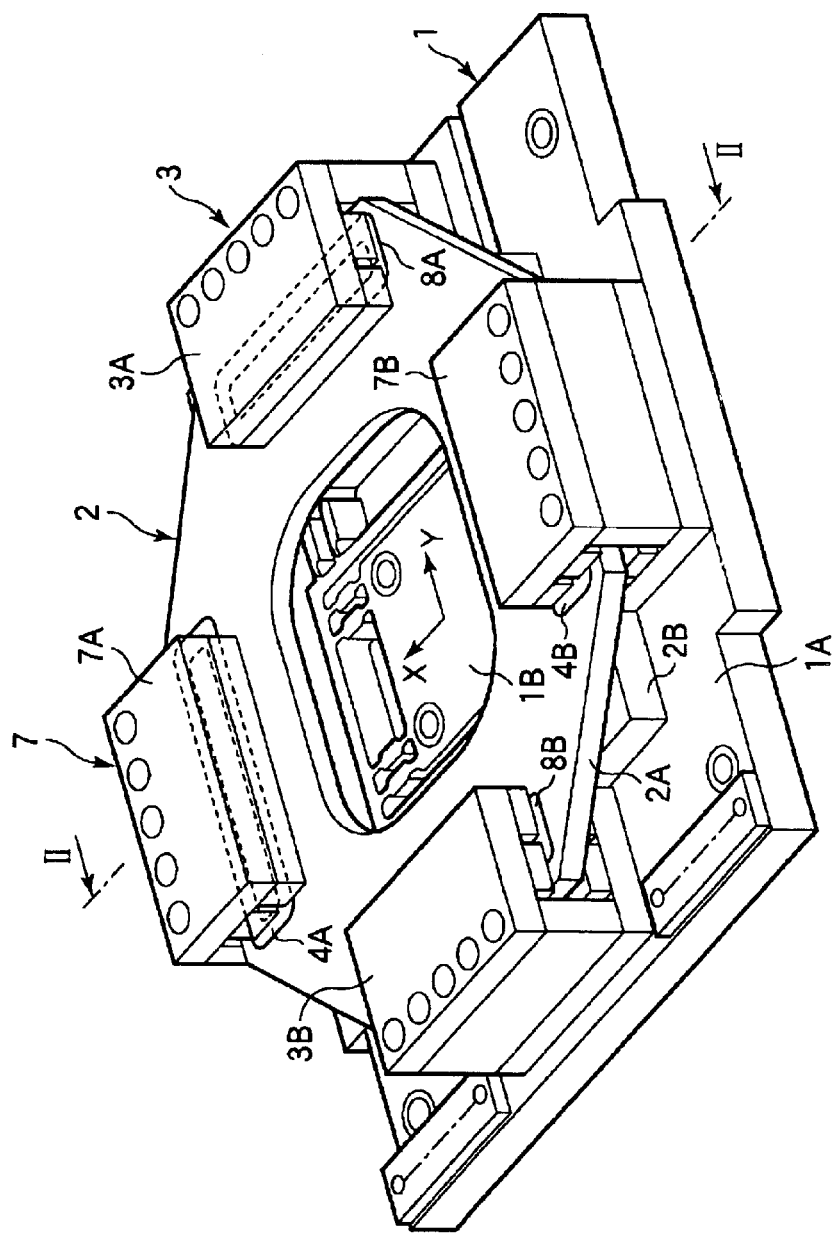
FIG. 1 is a perspective view of an X-Y stage apparatus according to a first embodiment of this invention.
Figure 2:
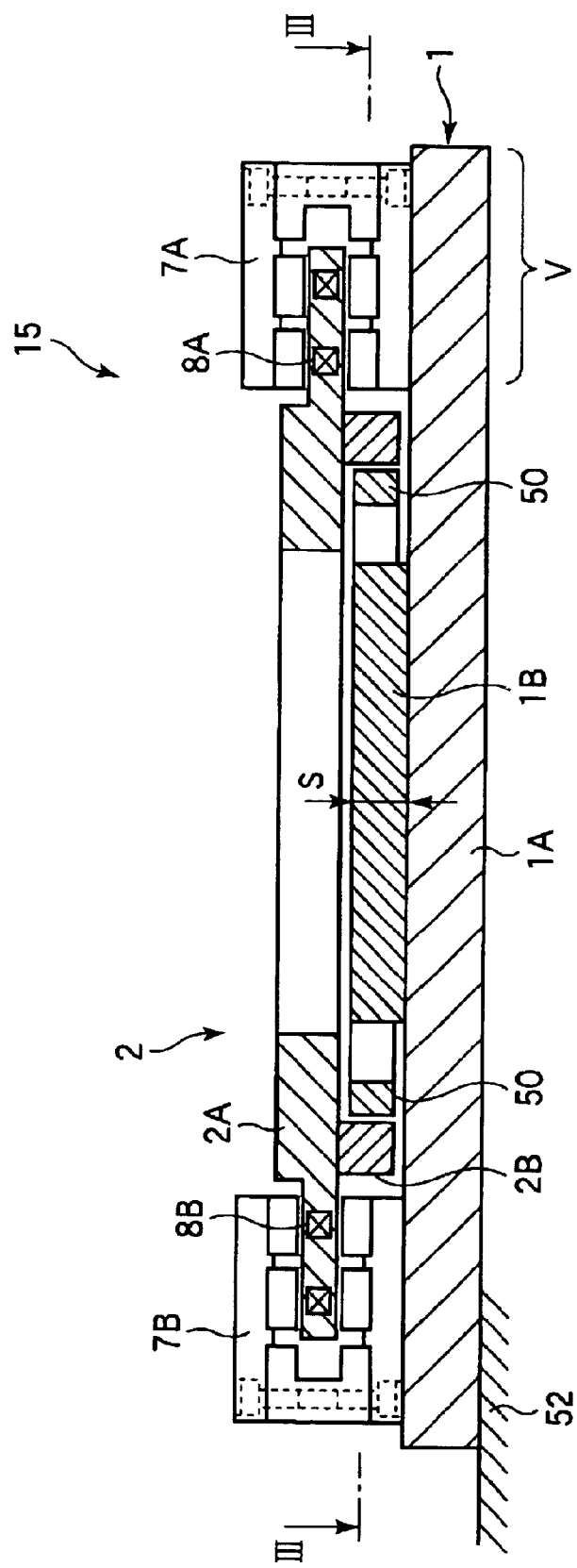
FIG. 2 is a sectional view taken along a line II—II in FIG. 1.

The whole constitution of an X-Y stage apparatus 15 according to an embodiment of the invention is shown in FIG. 1 and FIG. 2. This X-Y stage apparatus 15 comprises a moving table 2, which can move within the XY plane, and can position components (not shown) mounted on top of this moving table 2 within the XY plane.

The X-Y stage apparatus 15 also comprises a stationary base 1 arranged parallel to the moving table 2 (moving base 2A) with a prescribed clearance S spaced therebetween in the Z-axis direction, and an intermediate member 50 arranged between the stationary base 1 and the moving table 2.

The moving table 2 comprises a moving base 2B constituted in a rectangular ring-shape, and a mounting table 2A fixed and installed on top of the moving base 2B with bolts. Although it is not particularly shown, a prescribed plate is mounted onto the mounting table 2A. Hence the moving table 2 is composed of this plate, the moving base 2B, and the mounting table 2A. The stationary base 1 comprises a fixing table 1A directly fixed onto an outer member 52, and a plate-formed stationary base 1B fixed and installed onto this fixing table 1A with bolts.

A detail constitution of the intermediate member 50, and the relation of the arrangements of the intermediate member 50, the stationary base 1B, and the moving base 2B will be described with references to FIG. 3.

The intermediate member 50 is composed of two extended portions 50A in the X-axis direction, and two extended portions 50B in the Y-axis direction. These, as a whole, are shaped into a rectangular ring-shape within the XY plane. Some of the extended portions 50A and 50B in the X-axis direction and the Y-axis direction are partly bent to prevent them from interfering other devices, such as sensors for example.

A first elastic hinge 54 is arranged between the stationary base 1B (stationary base 1) and the intermediate member 50, and allows deformation in the X-axis direction. To be specific, the first elastic hinges 54 are arranged between the stationary base 1B and each of the two extended portions 50A in the X-axis direction. Among them, two sets of two first elastic hinges 54 are arranged in parallel between one of the extended portions 50A in the X-axis direction and the stationary base 1B with an interval of LX1. It is the same between the other extended portion 50A in the X-axis direction and the stationary base 1B.

A second elastic hinge 56 is arranged between the intermediate member 50 and the moving base 2B (moving table 2), and allows deformation in the Y-axis direction. To be specific, these second elastic hinge 56 are arranged between the moving base 2B and each of the two extended portions 50B in the Y-axis direction. In other words, two sets of two second elastic hinges 56 are arranged in parallel between one of the extended portions 50B in the Y-axis direction and the moving base 2B with an interval of LY1. It is completely the same between the other extended portions 50B in the Y-axis direction and the moving base 2B.

As a result, this intermediate member 50, the stationary base 1B, and the moving base 2B are arranged in a nested state, and as a whole, have a roughly line symmetric construction.

The first elastic hinge 54, which allows deformation in the X-axis direction, has flexible characteristics only in the X-axis direction, and rigid characteristics in the Y-axis and the Z-axis directions. Since it is arranged along the Y-axis direction within the XY plane, only a relative displacement in the X-axis direction is allowed between the members connected to both ends of the hinge. The second elastic hinge 56, which allows displacement in the Y-axis direction, has flexible characteristics only in the Y-axis direction, and rigid characteristics in the X-axis and the Z-axis directions. Since it is arranged along the X-axis direction within the XY plane, only a relative displacement in the Y-axis direction is allowed between the members connected to both ends of the hinge.

A construction of the first elastic hinge 54, which allows movement in the X-axis direction, will be described next. It should be noted that, a description of the construction or the like of the second elastic hinge 56 is omitted, because the construction of the second elastic hinge is almost the same as that of the first elastic hinge, except that the longitudinal direction differs in being the X-axis or the Y-axis direction, although there are some differences in sizes or the like.

Figure 6:
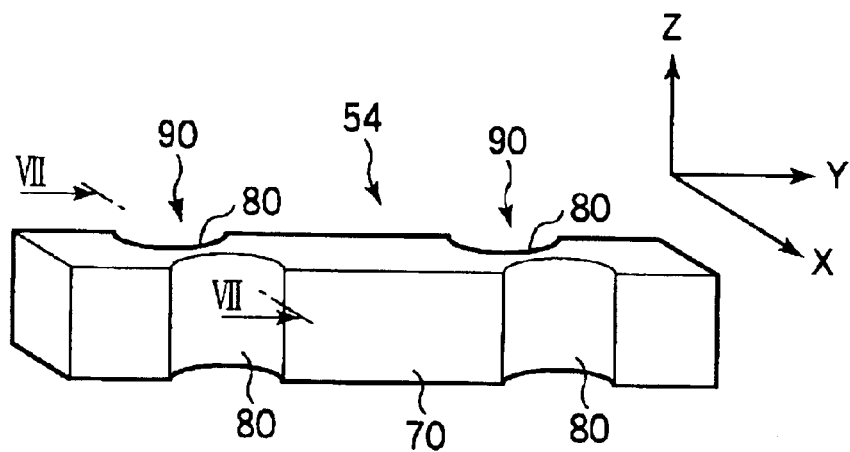
FIG. 6 is an enlarged perspective view showing the constitution of an elastic hinge in the same X-Y stage apparatus.

The first elastic hinge 54 is composed of a bridge member 70 connecting two members (the stationary base 1B and the intermediate member 50), as shown in the perspective view of FIG. 6. Notches 80 are formed at two positions separated in the longitudinal direction on the outer circumference surface of this bridge member 70, and these notches 80 constitute a reduced thickness portion 90, which is easy to bend and be deformed elastically. A relative displacement between two members can be allowed, with the bending deformation of this reduced thickness portion 90.

In this case, the notches 80 are formed as semicircles of symmetrical form, on two outer side faces facing the bending deformation direction of the bridge member 70 having a rectangular cross section (which is the X-axis direction in case of the first elastic hinge 54, or is the Y-axis direction in case of the second elastic hinge 56). This is done to reduce the thickness of a limited portion, and make it easy to bend and be deformed using this reduced thickness portion 90 as a bending point.

Figure 7:
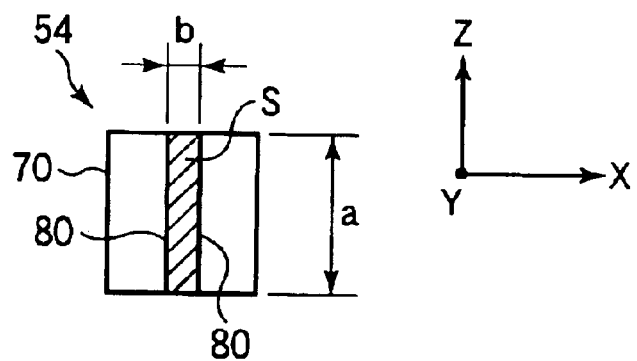
FIG. 7 is a sectional view taken along a line VII—VII in FIG. 6.

FIG. 7 shows a cross section of the reduced thickness portion 90 of the first elastic hinge 54.

This cross section S of the reduced thickness portion 90 is composed of a rectangular cross section, with the dimension "b" in the lateral direction (X-axis direction) shortened with regard to the dimension "a" in the longitudinal direction (Z-axis direction) corresponding to the thickness of the bridge member 70. Due to this, the reduced thickness portion 90 achieves characteristics, in which it is almost impossible to bend in the longitudinal direction (Z-axis direction), while it is easy to bend in the lateral direction (X-axis direction). Since the bridge member 70 acts as a tension rod in the longitudinal direction (Y-axis direction), the movement between the two members in the Y-axis direction is not allowed,.

Mutual effects among the first elastic hinge 54, the stationary base 1B, and the intermediate member 50 will be described next.

Figure 4A:
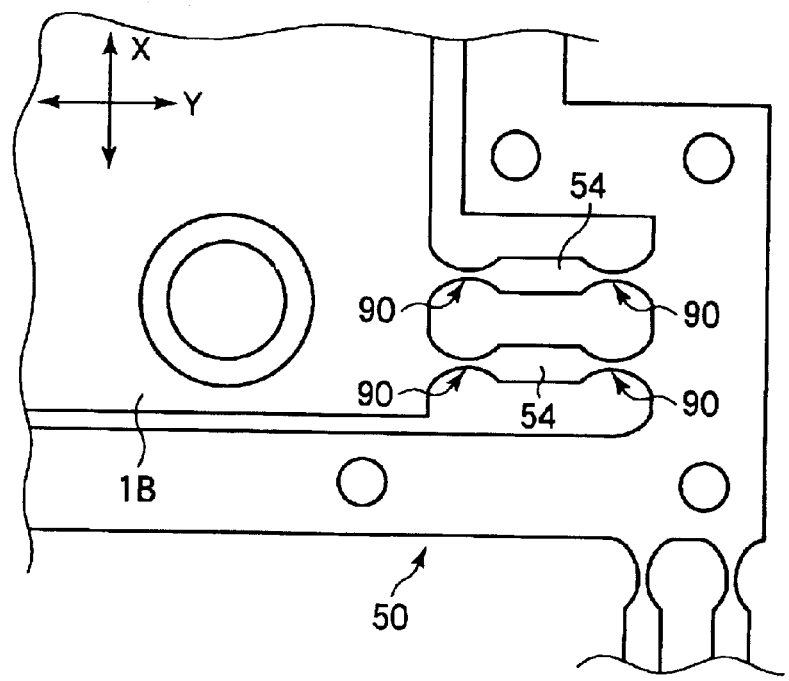
FIG. 4 is a partial sectional view showing a portion IV in FIG. 3, in enlarged form.
Figure 4B:
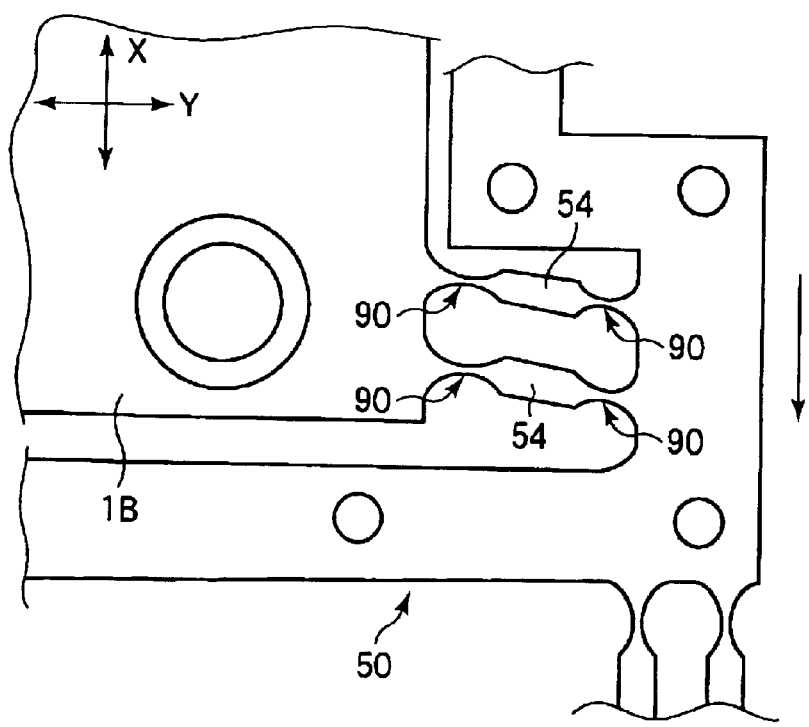

A pair of the first elastic hinges 54 have both ends fixed and supported by the fixing member 1B and the intermediate member 50, as shown enlarged in FIG. 4(A). As shown in FIG. 4(B), when the intermediate member 50 moves in the X-axis direction, relative to the stationary base 1B (downward direction in the drawing), the relative movement can be tracked, because each of the reduced thickness portions 90 on both ends of the first elastic hinges 54 are elastically deformed prior to any other portions. As a result, the intermediate member 50 is linearly guided in the X-axis direction by the first elastic hinges 54.

The second elastic hinge 56 has almost the same construction, although it is not shown in drawing. Therefore, the second elastic hinges 56 guide the moving base 2B in the Y-axis direction relative to the intermediate member 50.

In any of these cases, the first and second elastic hinges 54 and 56 function as a "rigid body" in the Z-axis direction (the direction perpendicular to the XY plane). Therefore, the intermediate member 50 is supported by the stationary base 1B in a cantilevered state through the intervention of the first elastic hinges 54, and the moving base 2B is supported by this intermediate member 50 in a cantilevered state through the intervention of the second elastic hinges 56. At last, the moving table 2 is supported within the XY plane without any supporting means in the Z-axis direction.

The total number of the first elastic hinges 54 in this embodiment is eight, but it is not limited in any way to that number, in this invention. However, in order that no torsion is generated on each of the elastic hinges 54 and 56, at least three, and preferably four or more of the elastic hinges 54 and 56 should be arranged, so that a prescribed "virtual plane" is constituted by connecting these hinges with a "virtual line". It is also preferred that they are arranged and installed at a location corresponding to both of the outer sides of the moving table 2 in order to make the moving table 2 more stable. This is the same for the second elastic hinges 56.

As a result, the intermediate member 50 is supported by the first elastic hinge 54 so that it can be displaced in the X-axis direction relative to the stationary base 1B, and the moving base 2B is supported by the second elastic hinge 56 so that it can be displaced in the Y-axis direction relative to the intermediate member 50. As a whole, the moving base 2B can be displaced in two independent directions (without interfering with each other), the X-axis direction and Y-axis direction, relative to the stationary base 1B. In other words, a guiding function in the X-axis and the Y-axis direction is exerted with the combination of the first and second elastic hinges 54 and 56. An extremely stable displacement characteristic can be achieved by this guiding function, intrinsically without any backlash, slip, or roll.

The constitution of the elastic hinges will be described in more detail later on.

Returning to FIG. 1 and FIG. 2, a Y-axis linear motor 3, which can relatively move the moving table 2 in the Y-axis direction, and an X-axis linear motor 7, which can relatively move the moving table 2 in the X-axis direction, are installed on the stationary base 1 and the moving table 2.

Each of the linear motors 3 and 7 has two driving units arranged serially in the driving direction (direction of the generated thrust), and functioning as a pair. For example, the X-axis linear motor 7 is provided with two driving units 7A and 7B arranged at both end sides in the X-axis direction of the moving,table 2, and these driving units 7A and 7B function as a set to generate thrust in the X-axis direction.

Figure 5:
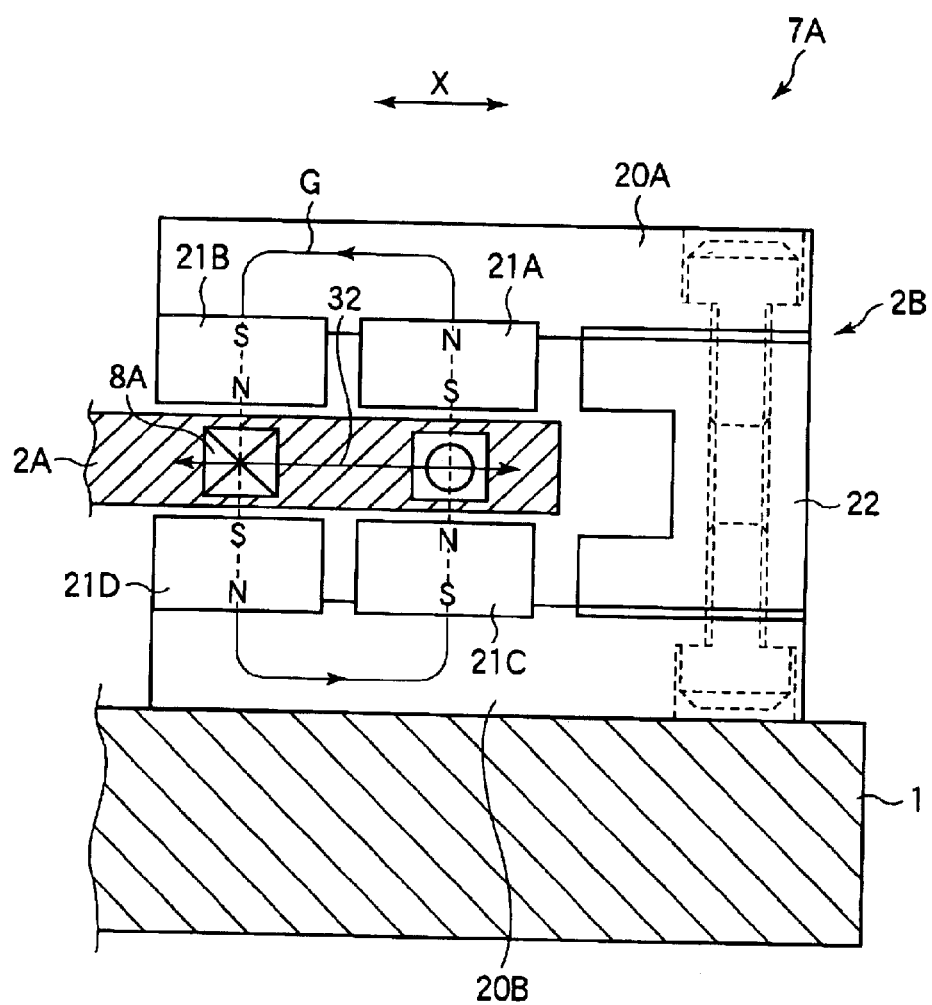
FIG. 5 is a partial sectional view showing a portion V in FIG. 2, in enlarged form.

In detail, as shown enlarged in FIG. 5, the driving unit 7A of the X-axis linear motor 7 (the same with the other linear motor), is provided with a magnet unit 28 that is fixed on the stationary base 1 side and functions as a stator, and a coil 8A that is fixed (embedded) on the mounting table 2A side and functions as a movable element.

The magnet unit 28 is provided with permanent magnets 21A to 21D, which are arranged so that a magnetic field G is generated in the Z-axis direction relative to the coil 8A, and two yokes 20A and 20B that support these permanent magnets 21A to 21D, and also a holder 22 that holds these yokes 20A and 20B with a prescribed interval between them. The whole magnet unit 28 is fixed by having one of the yokes 20B fixed to the stationary base 1. On the other hand, the coil 8A is arranged so that an electric current flows in the Y-axis direction within the above-mentioned magnetic field G in the Z-axis direction, and as a result, the coil 8A receives thrust force 32 in the X-axis direction.

In this embodiment, description was limited to the magnet unit 28 functioning as a stator, and the coil 8A functioning as a movable element. However these can be altered as a matter of course, and the magnet unit 28 can be made to function as a movable element, and the coil 8A can be made to function as a stator. The driving units need not be arranged as a pair 7A and 7B, but can be arranged as a single driving unit.

Figure 3:
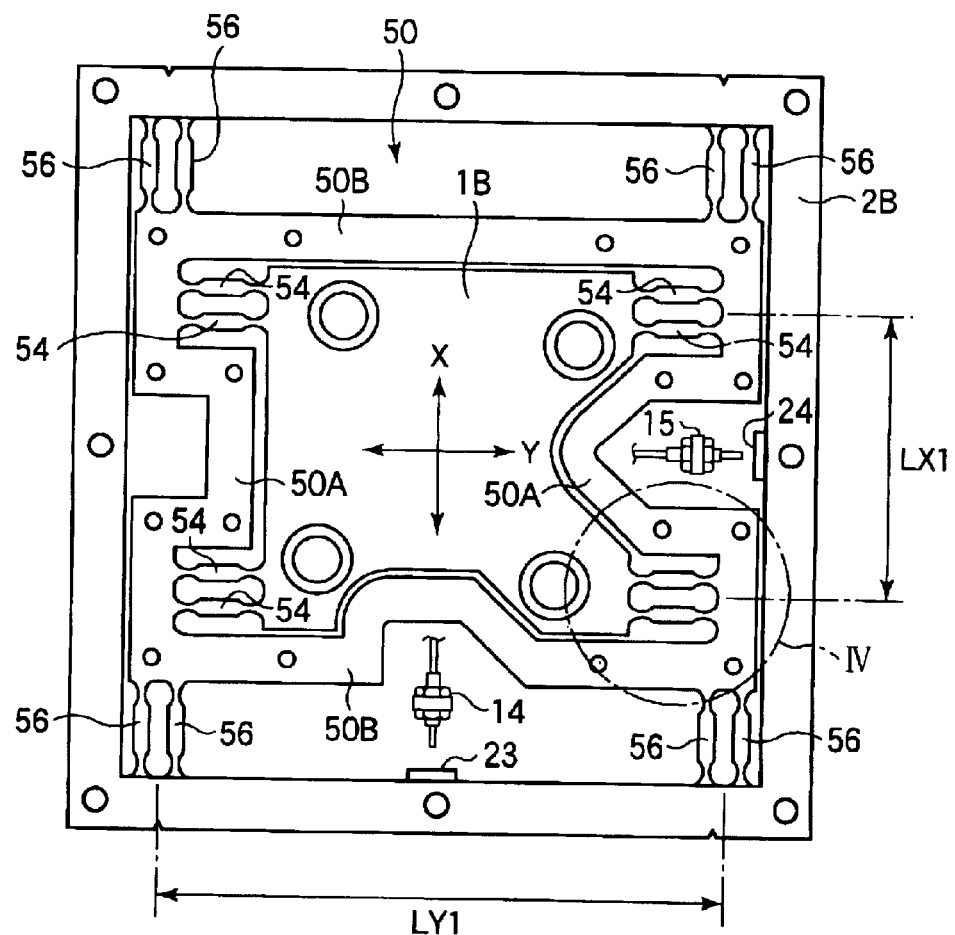
FIG. 3 is a sectional view taken along a line III—III in FIG. 2.

As shown in FIG. 3, an X-axis reference plane 23 and a Y-axis reference plane 24 are formed on the inner circumference side of the ring-shaped moving base 2B, and an X-axis displacement sensor 14 and a Y-axis displacement sensor 15 are installed on the stationary base 1 side, opposing each of the reference planes 23 and 24. These displacement sensors 14 and 15 measure the amount of displacement of the moving table 2 in the X-axis direction, and the amount of displacement in the Y-axis direction, relative to the stationary base 1.

Figure 8:
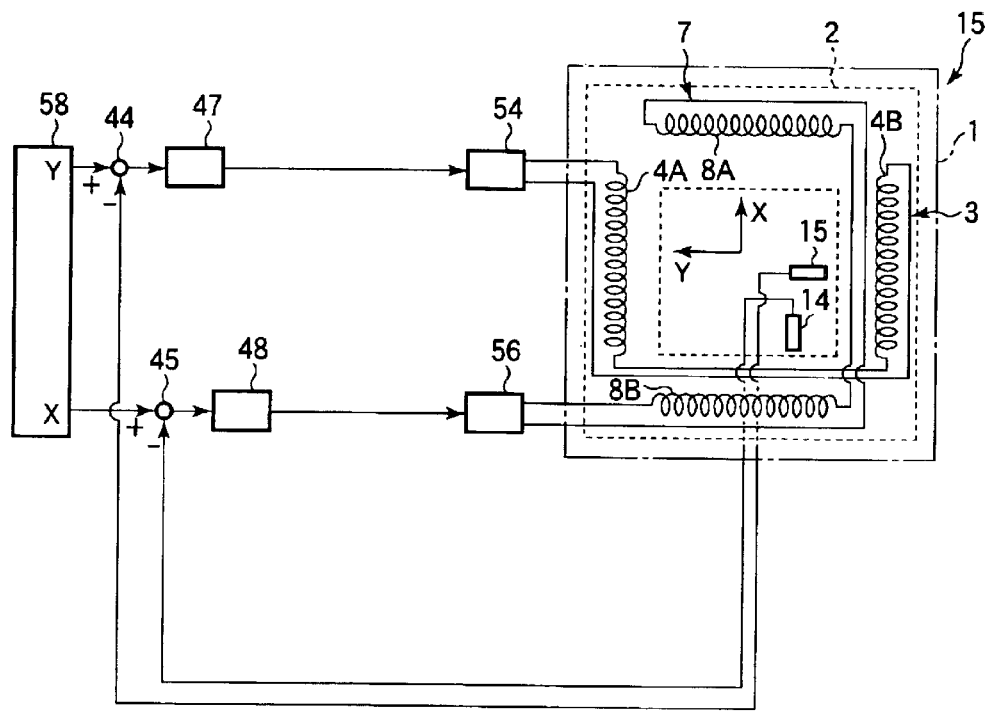
FIG. 8 is a control system diagram showing the constitution of a control system adopted in the same X-Y stage apparatus.

A constitution of a control system adopted for the above-mentioned X-Y stage apparatus 15 will be described, with references to FIG. 8.

As already mentioned, a total of four coils 4A, 4B, 8A, and 8B are embedded in the moving table 2 of the X-Y stage apparatus 15. A thrust force in the Y-axis direction is generated by the pair of coils 4A and 4B, and a thrust force in the X-axis direction is generated by the pair of coils 8A and 8B, and each of the pair of coils are controlled as a unit (set).

The control system is provided with a subtracter 44 that has a detected value of the Y-axis displacement sensor 16 inputted, and a subtracter 45 that has a detected value of the X-axis displacement sensor 14 inputted.

The above-mentioned subtracters 44 and 45 into which each of the detected values is inputted also have various command values inputted from positioning command outputting means 58. This positioning command output means 58 configures the position of the moving table 2 in the X-axis direction and outputs it to the subtracter 45, and also configures the position of the moving table 2 in the Y-axis direction and outputs it to the subtracter 44. The subtracter 44 calculates the deviation of the command position in the Y-axis direction and the detected value of the Y-axis displacement sensor 16, and outputs the result to a Y-axis position control compensator 47. The subtracter 45 calculates the deviation of the command position in the X-axis direction and the detected value of the X-axis displacement sensor 14, and outputs the result to an X-axis position control compensator 48.

In each of the position control compensators 47 and 48, the actuating amount for each of the linear motors are calculated from each of the inputted values. In other words, the Y-axis position control compensator 47 outputs the amount of actuation in the Y-axis direction to the Y-axis linear motor 3. Likewise, the X-axis position control compensator 48 outputs the amount of actuation in the X-axis direction to the X-axis linear motor 7.

Electric current amplifiers 54 and 56 are connected just in front of the pairs of coils (4A, 4B) and (8A, 8B), respectively. Therefore, the electric current amplifiers 54 and 56 feeds prescribed amounts of electric currents to the pairs of coils (4A, 4B) and (8A, 8B), respectively. As a result, a desired thrust force is generated in each of the pairs of coils (4A, 4B) and (8A, 8B), and the moving table 2 is moved in the X-Y axis direction with this force.

In this X-Y stage apparatus 15, linear motors 3 and 7 are adopted for a driving apparatus. Each of these linear motors 3 and 7 has its stator and movable element installed directly between the stationary base 1 and the moving table 2, and can drive the moving table 2 directly and linearly with a "non-contact state" thrust of the magnetic force. Therefore, the inertia load in the X-axis and Y-axis directions will consist mostly of the moving table 2, and it will be possible to achieve a high-speed control with high responsiveness, with its center of gravity being low.

Since each of the linear motors 3 and 7 is of a non-contact type, it is possible to "allow" driving the moving table 2 in one direction (the X-axis direction, for example), and also driving the moving table 2 in an orthogonal direction to that direction (the Y-axis direction, for example). Furthermore, it is possible to allow an "slight deviation" in the Y-axis direction of the moving table 2, generated by the first elastic hinge 54 getting slanted, when the moving table 2 moves in the X-axis direction, for example. The error of the "slight deviation" can be compensated, by the orthogonal Y-axis linear motor 3 and the second elastic hinges 56. In this way, the elastic hinges 54 and 56, and the linear motors 3 and 7 are combined under a rational philosophy, and an extremely high-precision positioning within the XY plane is made possible, by the synergy effect of this combination.

Since the reaction force (restoring force) of the first and second elastic hinges 54 and 56 generated corresponding to the displacement of the moving table 2 has a "linearity" (or characteristics close to linearity), it is easy to conduct a feedback control of the moving table 2 with the measured values in the X-axis and Y-axis directions. A stable detection value can be obtained from the X-Y displacement sensors 14 and 16, particularly since the linear motors 3 and 7 intrinsically have only a small amount of vibration, and since the vibration is not directly transmitted to the moving table 2. Hence the responsiveness of the control can be greatly enhanced thereby.

It is possible to slightly vibrate the components arranged and installed on top of the moving table 2 cyclically, or make them do an oscillating-rotation (these movements can be conceived as a high-speed and cyclic positioning control), when each of the driving forces of the linear motors 3 and 7, and each of the restoring forces of the elastic hinges 54 and 56 are combined rationally. This is a result of a fusion of the characteristics of the linear motors 3 and 7 being capable of changing the direction of the thrust force between normal and reverse at high-speed (electrically), and the characteristics of the elastic hinge construction having a restoring force which is nearly linear.

Since the intermediate member 50 is constituted in a ring-shape, it is possible to arrange the stationary base 1B (the portion that has the elastic hinge fixed) at the inner circumference side of the intermediate member 50; and arrange the moving base 2B (the portion that has the elastic hinge fixed) at the outer circumference side. Since elastic hinges 54 and 56 are arranged and installed on each of the four extended-portions 50A and 50B (on each of the four sides of the ring), the rotation of the intermediate member 50 and the moving table 2 are suppressed by the relative balance of these elastic hinges 54 and 56, and a positioning with high precision is possible. In other words, it is possible to reflect the "linear guide function" of the first and second elastic hinges 54 and 56 upon an effective movement of the moving table 2. Since constituting in such a ring-shape increases rigidity, an elastic deformation of the intermediate member 50 is suppressed, and a positioning with even higher precision is made possible. It is also possible to arrange the moving base on the inner circumference side, and arrange the stationary base on the outer circumference side, contrary to the above-mentioned first embodiment.

In the first embodiment, a description was made limiting the intermediate member to have a ring-shape, but there is no particular limitation in the number, shape, and location of the intermediate member and the elastic hinge. These should be configured as appropriate, corresponding to necessity.

Figure 9:
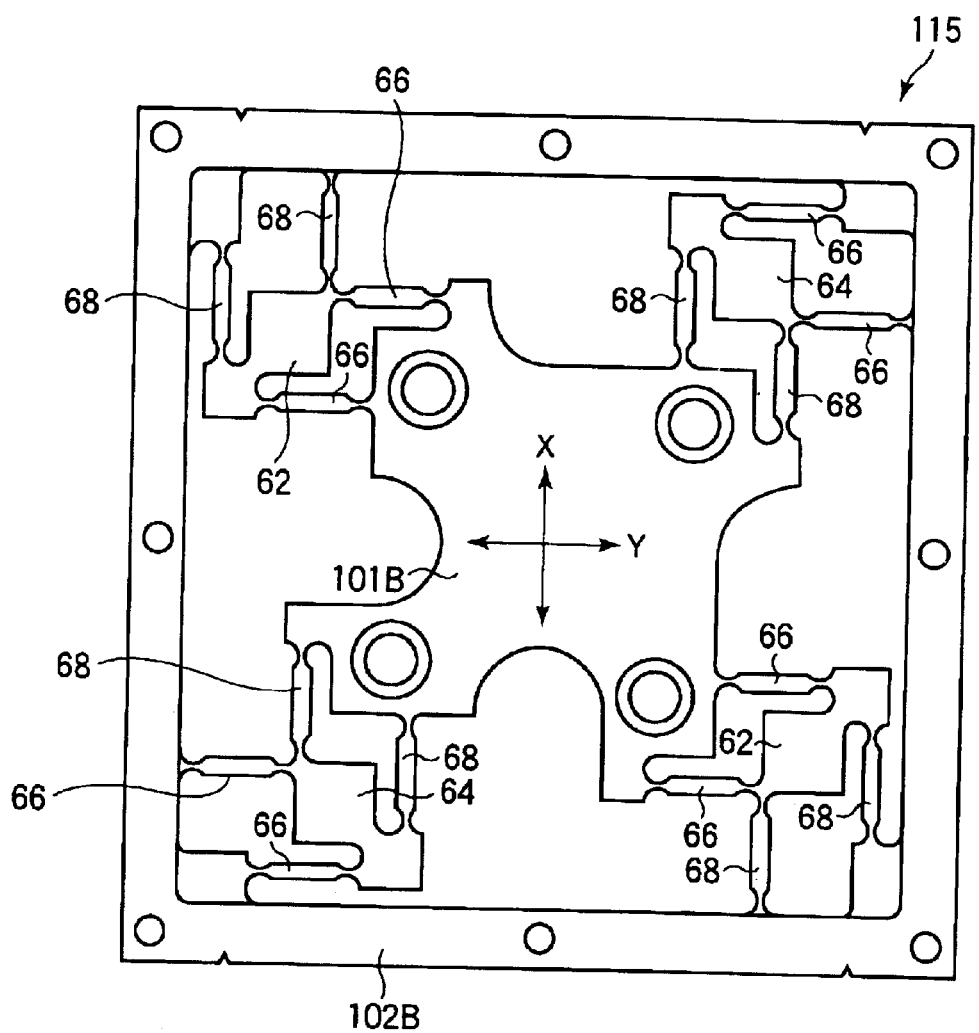
FIG. 9 is a sectional view showing the arrangement and others of an elastic hinge in an X-Y stage apparatus according to a second embodiment of this invention.

An X-Y stage apparatus 115 according to a second embodiment of the invention will be described, with references to FIG. 9.

This X-Y stage apparatus 115 differs from the X-Y stage apparatus 15 in the first embodiment, mainly in the constitution of the intermediate member and the first and second elastic hinges. Therefore, a description of the constitution of the whole system and drawings have been omitted to avoid an overlap of description. And the least significant two digits of the reference numerals for almost similar portions and members with those in the first embodiment have been made the same numerals, and a detailed description is omitted.

In the X-Y stage apparatus 115, the intermediate member is divided into a plurality of intermediate members, including a first intermediate member 62 and a second intermediate member 64.

A first elastic hinge 66 is arranged between a stationary base 101B and the first intermediate member 62, and relative displacements between both of the members (the stationary base 101B and the first intermediate member 62) in the X-axis direction are allowed. A second elastic hinge 68 is arranged between this first intermediate member 62 and the moving base 102B, and relative displacements, between both of the members (the first intermediate member 62 and the moving base 102B) in the Y-axis direction are allowed. As a result, relative displacements of the moving table 102 in the X-axis and the Y-axis directions relative to the stationary base 101 are allowed.

On the other hand, a second elastic hinge 68 is arranged between the stationary base 101B and the second intermediate member 64, and relative displacements between both of the members (the stationary base 101B and the second intermediate member 64) in the Y-axis direction are allowed. A first elastic hinge 66 is arranged between this second intermediate member 64 and the moving base 102B, and relative displacements between both of the members (the second intermediate member 64 and the moving base 102B) in the X-axis direction are allowed. As a result, relative displacements of the moving table 102 in the-X-axis and the Y-axis directions relative to the stationary base 101 are allowed. A detailed description of the constitution and function of these first and second elastic hinges 66 and 68 is omitted, because they are almost the same as those shown in FIG. 6 and FIG. 7.

These first and second intermediate members 62 and 64, and the first and second elastic hinges 66 and 68 are arranged so that they, as a whole, have a point-symmetric construction. Specifically, the two first intermediate members 62, and the two second intermediate members 64 are arranged diagonally.

The effects will be described next.

Since the first elastic hinges 66 are elastically deformed when the moving base 102B moves in the X-axis direction, the two first intermediate members 62 also move in the X-axis direction together with the moving base 102B. In this case, the two second intermediate members 64 virtually do not move at all, since the second elastic hinges 68 are in the rigid direction. On the contrary, the two second intermediate members 64 move in the X-axis direction together with the moving base 102B, since the second elastic hinge 68 is elastically deformed when the moving base 102B moves in the Y-axis direction. In this case, the two first intermediate members 62 virtually do not move at all, since the first elastic hinges 66 are in the rigid direction.

The following are summaries of the relations shown above.

(1) When the moving table 102 (the moving base 102B) moves in the X-axis direction, the two first intermediate members 62 move in the X-axis direction tracking the moving table 102.

(2) When the moving table 102 (the moving base 102B) moves in the Y-axis direction, the two second intermediate members 64 move in the Y-axis direction tracking the moving table 102.

As a result, when moving in the X-axis direction, the inertia load acting upon the X-axis linear motor 107 will be "the moving table 102"+"the first intermediate members 62" (ignoring the components mounted on the moving table 102). When moving in the Y-axis direction, the inertia load acting upon the Y-axis linear motor 103 will be "the moving table 102"+"the second intermediate members 64". Since, in this embodiment, the number (two) and size of the first and second intermediate members 62 and 64 are made to be the same, the inertia load in the X-axis and Y-axis directions are made equal, and makes it possible to have a balanced positioning control in both of the directions. As a matter of course, effects similar to those of the X-Y stage apparatus 15 of the first embodiment, which is shown in FIG. 1 and others, can be achieved.

In above-mentioned first and second embodiments, each of the elastic hinges was limited to being arranged in the X-axis or Y-axis direction (within the XY plane). But as apparent from above-mentioned philosophy, the compatibility between the "elastic hinge" and the "linear motor" is extremely good, hence it is possible to achieve similar effects with a constitution of the following third embodiment.

Figure 10:
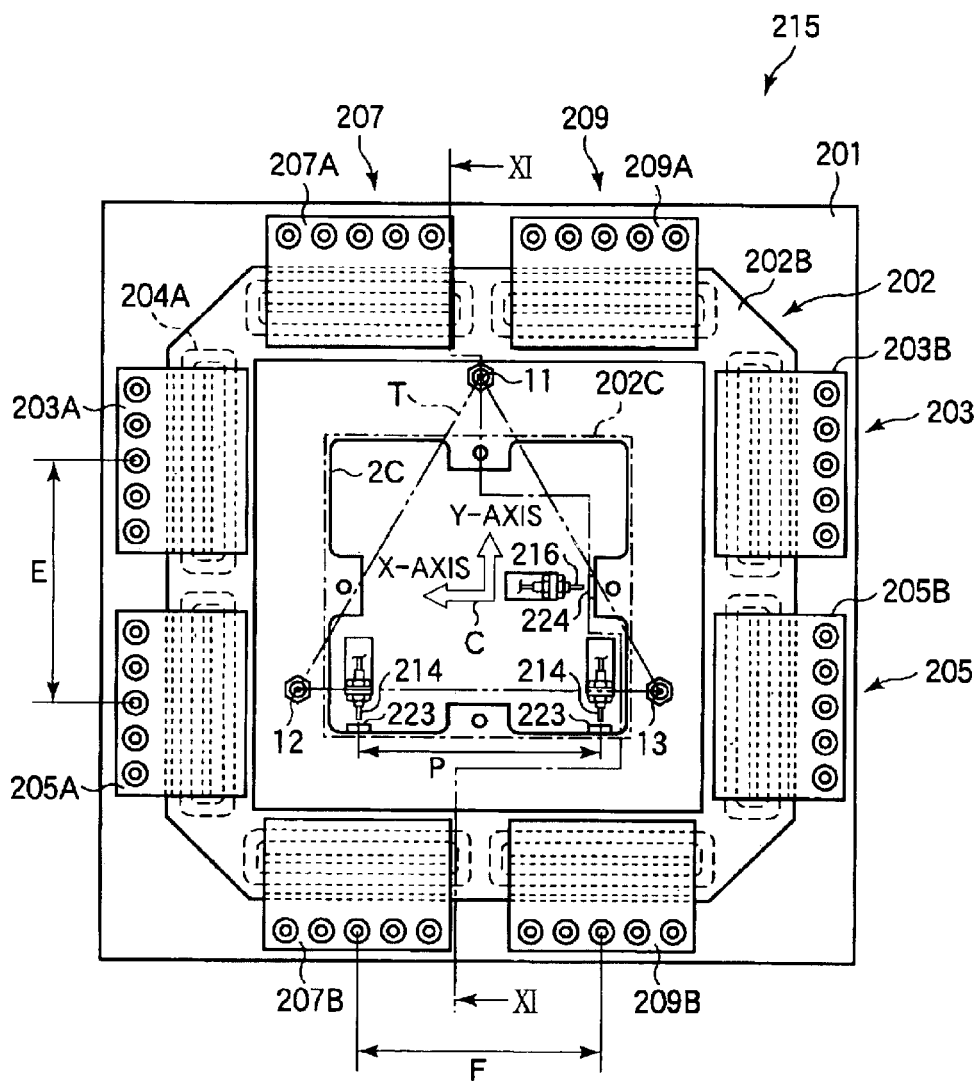
FIG. 10 is a plan view showing an X-Y stage apparatus according to a third embodiment of this invention.
Figure 11:
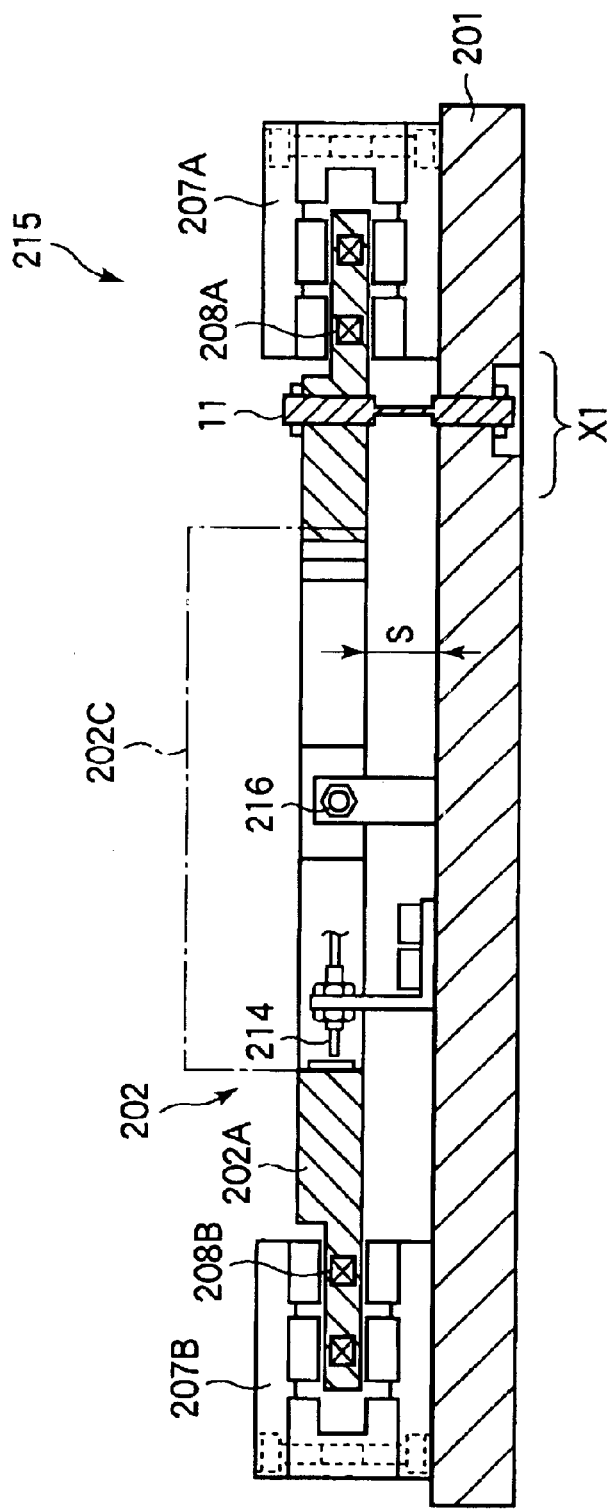
FIG. 11 is a sectional view taken along a line XI—XI in FIG. 10.

The whole constitution of an X-Y stage apparatus 215 according to a third embodiment is shown in FIG. 10 and FIG. 11. In order to avoid an overlapping of descriptions, a detailed description has been omitted for those portions and members almost similar to those in the first and second embodiments, by making the least significant two digits of the reference numerals for those portions and members the same numerals as those in the first embodiment.

In this X-Y stage apparatus 215, the mounting table 202A of the moving table 202 is constituted by a rectangular tabular-member, and an opening 2C is formed inside. It should be noted that, there is no moving base or stationary base that was indicated in the first embodiment, or others. There is a plate 202C (shown in dotted lines) mounted on top of the mounting table 202A, and these two members constitute the moving table 202.

The stationary base 201 is arranged parallel to the moving table 202, with a prescribed clearance S spaced in the Z-axis direction. Three elastic hinges 11, 12, and 13 in the Z-axis direction are arranged in this clearance S, so that their both ends are fixed and supported by the stationary base 201 and the moving table 202. The three elastic hinges 11, 12, and 13 are mounted, so that they are positioned at the corresponding positions with the respective apex locations of a virtual equilateral triangle T within the XY plane, where the location of the center of gravity of the triangle coincides with the center C of the gravity of the moving table 202. By doing so, the moving table 202 can be supported in a stable manner with the least number (three) of hinges.

There are two X-axis reference planes 223 arranged with a prescribed interval P in the Y-axis direction, and a Y-axis reference plane 224 formed in the opening 202C of the base table 202A. Furthermore, two X-axis displacement sensors 214 and a single Y-axis displacement sensor 216 are installed on the stationary base 1 side, opposing the respective measuring reference planes 223 and 224. The reason why the two X-axis displacement sensors 214 were installed is that the difference in the amount of displacement between the X-axis displacement sensors 214 is used to measure the rotated angle of the moving table 202.

Figure 12:
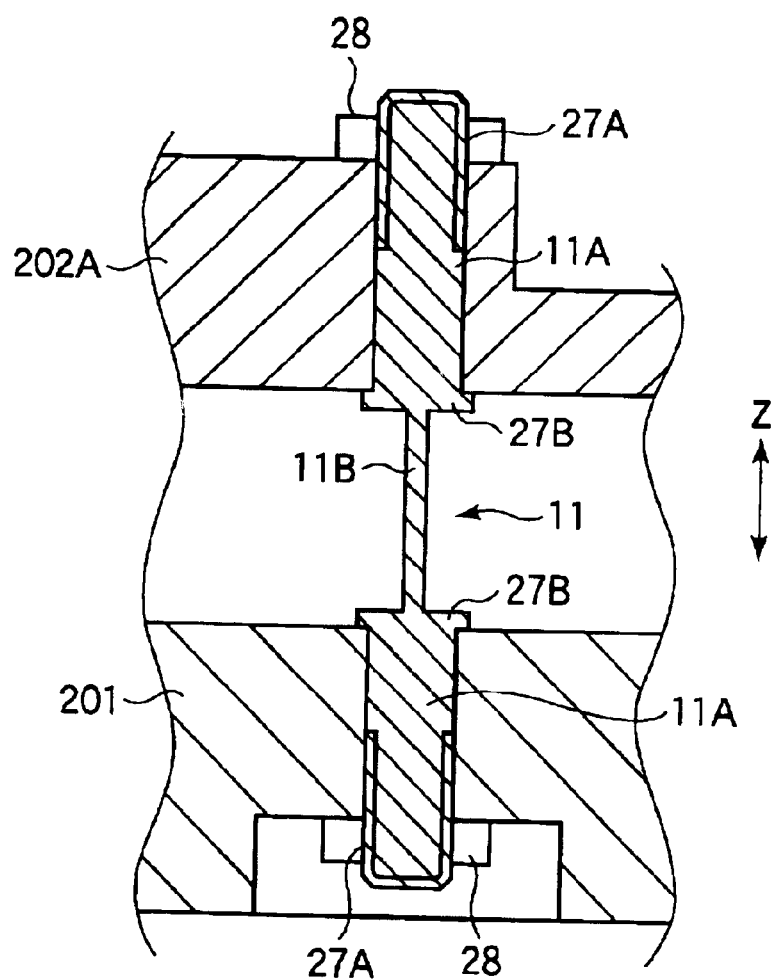
FIG. 12 is a partial sectional view showing the X1 portion in FIG. 11, in enlarged form.

As shown enlarged in FIG. 12, the elastic hinge 11 (same with 12 and 13) is a rod-form member long in the Z-axis direction, and has rigid characteristics only in its longitudinal direction, and has flexible characteristics in the other directions (in the XY plane direction). This elastic hinge 11 is constituted by a large diameter portion 11A on both end sides, and a small diameter portion 11B formed between them, and a male screw 27A is formed on the axis-end side (outer side) of this large diameter portion 11A, and a tier portion 27B is formed on the small diameter portion 11B side (inner side). Therefore, when the large diameter portion 11A is inserted into the through holes 25 formed on the stationary base 201 and the mounting table 202A, respectively, and nuts 28 are mounted from both end sides, the hinge is fastened to the stationary base 201 and the mounting table 202A. It is possible to elastically deform the small diameter portion 11B easily, and this makes it possible to move the moving table 202 within the XY plane.

Returning to FIG. 10, two Y-axis linear motors 203 and 205 are installed on the stationary base 201 and the moving table 202, which can relatively move the moving table 202 (relative to the stationary base 201) in the Y-axis direction. Similarly, two X-axis linear motor 207 and 209 are arranged, which can relatively move the moving table 202 in the X-axis direction, relative to the stationary base 201. The reason why the two linear motors in each of the directions were arranged and installed, is to also control the rotation of the moving table 202 around the Z-axis, by independently controlling each of the thrust forces.

The elastic hinges 11, 12, and 13 in the Z-axis direction of the X-Y stage apparatus 215 cannot guide the moving table 202 "linearly" in the X-axis and Y-axis directions, due to its construction. But since the X-axis and Y-axis linear motors 203, 205, 207, 209, which can generate a linear thrust force, are used as the driving source, these also serve as a so-called "non-contact linear guide". In other words, each of the linear motors serves as a "driver" and also as a "guide (regulator)."

The moving table 202 is also made possible to rotate around the Z-axis direction, hence it is possible to correct the rotational error of the components mounted on the moving table 202 in the Z-axis direction. The reason why such a control is possible is because the linear motor, which drives with the magnetic force in a non-contact state, can also allow a "rotation" of the moving table 202.

As apparent from above, a high-speed and high-precision control in the X-Y axis direction and the rotating direction can be achieved, even with a simple stage constitution, and even with few driving sources (linear motors), since the linear motors and the elastic hinges can be combined extremely rationally.

When the amount of movement of the moving table 202 is large, the amount of elastic deformation (amount of bending) of the support members 11, 12, and 13 also become large, and a change in the location of the moving table 202 in the Z-axis direction (so-called height location) also occurs. This change in location in the Z-axis direction is within the scope of this embodiment, and this change in location in the Z-axis direction should be configured to be within the ranges that can be tolerated, by the user of the X-Y stage apparatus 215. In other words, the user should configure the moving distance limits in the X-axis and Y-axis directions, which corresponds to the tolerable amount of change in location in the Z-axis direction.

Other constitutions of the elastic hinges will be described in the, following.

The elastic hinge 54 shown in FIG. 6 and FIG. 7 has the thickness of the reduced thickness portion 90 the thinnest, and the maximum stress generates in this reduced thickness portion 90 when the elastic hinge 54 is deformed. Hence, it is necessary to take into account sufficiently the stress acted upon a limited portion, when designing the elastic hinge 54.

Figure 13:
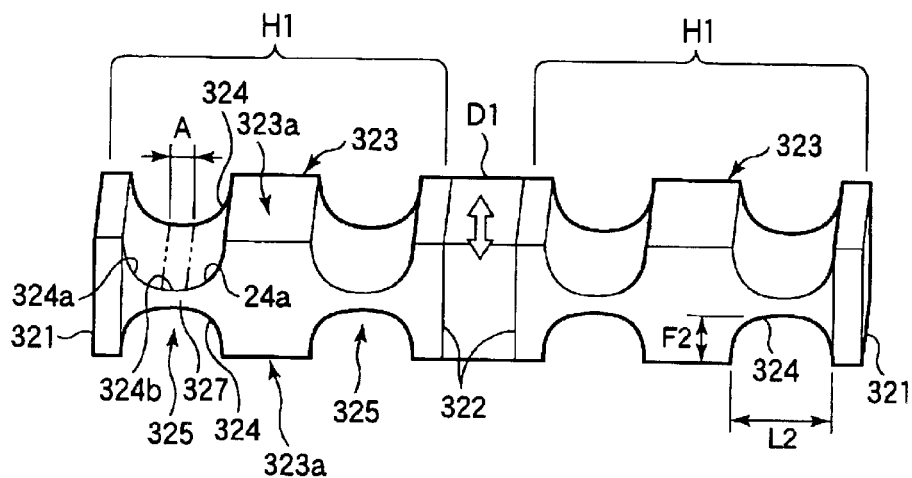
FIG. 13 is a perspective view showing, in model form, a state in which an elastic hinge of an embodiment of this invention is embedded.

FIG. 13 is a constitutional drawing showing, in model form, the constitution of an improved elastic hinge that takes into account the above-mentioned point. These elastic hinges H1 are arranged on both sides of a driving portion D1 (corresponding to the moving base 2B or the intermediate member 50 in FIG. 3). One end 321 of the hinge is fixed to the intermediate member 50 or the base 1B, and the other end 322 is fixed to the driving portion D1. Different reference numerals are used here, to generalize matters.

The elastic hinge H1 has a reduced thickness portion 325, which is easy to bend and be deformed elastically, formed by having notches 324 formed at two positions separated in the longitudinal direction of a metallic bridge member 323 (other elastic materials also possible) that connects two members, and on the outer circumference surface of the bridge member 323. A bending deformation of this reduced thickness portion 325 allows the relative displacement between the two members. Specifically, the two members correspond to the driving portion D1 (which is the moving base 2B or the intermediate base 50), and the intermediate base 50 or the base 1B.

The thickness of a limited portion of the elastic hinge H1 is thinned (that is, to make the reduced thickness portion 325) by having symmetrical-shaped notches 324 formed on two outer side faces 323a of the bridge member 323 having a rectangular cross section, the notches facing in the direction that the bridge member 323 is being bent and deformed. Thereby the elastic hinge H1 is constituted so that it is easy to bend and be deformed, using the minimum cross section portion (range shown as A in the figure) as a bending point. The bending directions of the two reduced thickness portions 325 are configured to be in the same direction.

The aforementioned notch 324 has quadrant curves 324a on both ends, and has a notched cross section of a roughly semicircle outline, with a straight line 324b connecting these curves 324a. The straight line portion 324b corresponds to the minimum cross section portion at the center of the reduced thickness portion 325 in the longitudinal direction. A parallel portion 327 (the range shown as reference symbol A) with unchanged cross section is formed, by having this straight line portion 324b allocated for a prescribed length of the reduced thickness portion 325 in the longitudinal direction. By doing so, the depth F2 of the notch 324 is configured to be smaller than L2/2, where L2 is the length of the notch 324.

Since the depth F2 of the notch 324 is suppressed to be smaller than half the length L2 of the notch 324 in such a way, the maximum stress can be decreased in comparison to conventional elastic hinges. Particularly since an unchanged cross section portion (the parallel portion 327 with a prescribed distance) is allocated in the minimum cross section portion at the center of the reduced thickness portion 325 in the longitudinal direction, the stress can be spread out to a broad range, because the thinnest portions of the reduced thickness portion 325 can be made to be broad. The curve of the notch 324 can be kept mild, and a concentration of stress can be eased to a minimum, since the cross section of the notch 324 is formed by an outline utilizing a portion of an arc. These effects have been confirmed in real simulations.

A directionality of the bending can be prescribed, and a balanced bending deformation is made possible, since symmetrically formed notches 324 are formed on two opposing outer side faces 323a of the bridge members 323 having a rectangular cross section. Furthermore, these elastic hinges 320 have the reduced thickness portions 325, which are easy to bend and elastically be deformed, installed at two positions in the longitudinal direction of the bridge member 323, so that they can be bent and deformed in the same direction. This allows a relative parallel movement of two members, and makes it easy to maintain linearity in displacements, when applied to a stage-apparatus.

Figure 14:
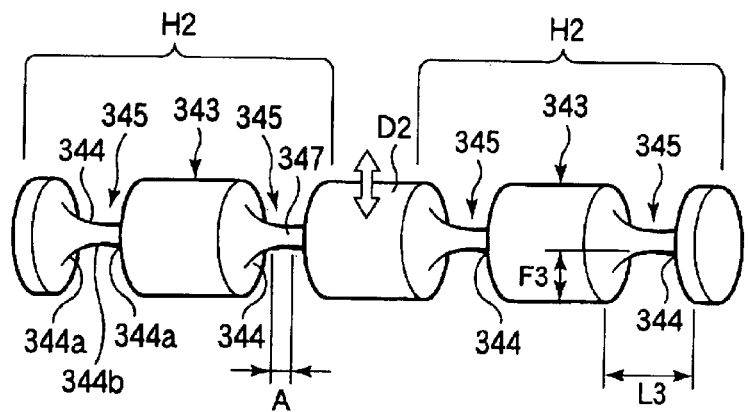
FIG. 14 is a perspective view showing a variation of the same.
Figure 15:
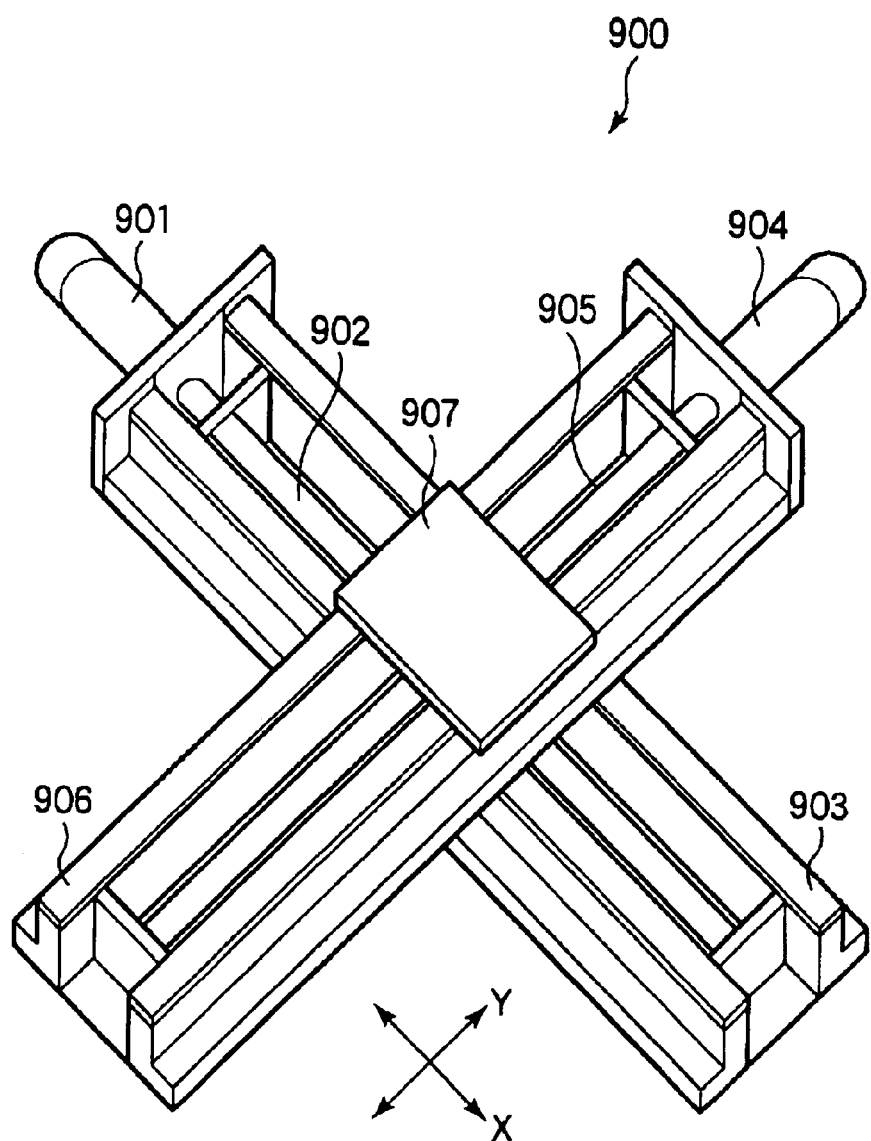
FIG. 15 is a perspective view showing a conventional X-Y stage apparatus.

FIG. 14 is a perspective view of a mechanism embedded with an elastic hinge H2 according to yet another variation.

The whole mechanism, including a driving portion D2 and elastic hinges H2 on both sides of the driving portion D2, is formed into a round bar form with a circular cross section. The elastic hinge H2 has reduced thickness portions 325 formed by annular-shaped notches 344, at two positions separated in the longitudinal direction of a bridge member 343, which is composed of a round-bar. In this case, the notch 344 also has its cross section formed a rough semicircle shape, and the outline of the cross section of the notch 344 is composed of quadrant curves 344a on both ends, and a straight line 344b between them. This straight line portion 344b becomes a parallel portion 347 (the range shown with reference symbol A) with an unchanging minimum cross-section-area for a prescribed length. By doing so, the depth F3 of the notch 344 is configured to be smaller than L3/2, where L3 is the length of the notch 344.

In this elastic hinge H2, the notch 344 is provided in an annular form on the outer circumference of the bridge member 343, and a reduced thickness portion 345 is formed with its diameter made small. Therefore, the elastic hinge H2 having a driving portion D2 is easy to bend in all directions, and has hinge characteristics with no directionality in bending.

It should be noted that, it is possible to choose a cross sectional shape of the bridge member 343 randomly from among other shapes, rather than a rectangle or a circle.

In the above-mentioned embodiments, parallel portions 327 and 347 with unchanged cross section were allocated in the minimum cross section portion at the center of the reduced thickness portions 325 and 345 in the longitudinal direction, as examples. However, it is possible to satisfy the aforementioned conditions while making the sectional curves of the notch milder, by forming notched cross sections with an outline of a circular-arc smaller than a semicircle, or by forming a notched cross section with an outline of an ellipse-arc, for example. Therefore, it is possible to attempt at decreasing the maximum stress with these methods.

Although these types of hinges are somewhat inferior to the above-mentioned embodiment with regard to stress dispersion, because the locations having the smallest cross section converge to one point in the longitudinal direction, it is easy to design them because their shape is simple, and in some cases, cost can be reduced accordingly.

In this way, the maximum stress acted upon the elastic hinge can be reduced, and the durability enhanced easily, by suppressing the depth of the notch to be smaller than half the length L of the notch, for notches constituting the reduced thickness portion that makes the bending deformation easier.

However, the use of such types of elastic hinges is not essential for this invention, as noted before.

What is claimed is:

1. An X-Y stage apparatus comprising:
   a stationary base; and
   a moving table being able to be displaced in an XY plane relative to a stationary base, provided that an X-axis and a Y-axis are at right angles to each other,
   wherein the X-Y stage apparatus further comprises a plurality of elastic hinges of one or more kind, having characteristics with flexibility only in one direction among an X-axis direction and a Y-axis direction, and rigidity in the direction of the other axis, the plurality of elastic hinges being able to allow a relative displacement between members connected to both sides of the hinge only in the flexible direction by being arranged along the rigid direction,
   the moving table is supported within the XY plane relative to the stationary base, with slight displacement made possible, by utilizing an elastic deformation of each of the elastic hinges in the flexible direction,
   the X-Y stage apparatus further comprises a linear motor in the flexible direction having a stator portion arranged directly on the stationary base and a moving portion directly on the moving table, respectively, and being able to move the moving table in the flexible direction relative to the stationary base,
   so that the moving table is displaced slightly in the flexible direction within the XY plane relative to the stationary base by the flexible direction linear motor.

2. An X-Y stage apparatus comprising:
   a stationary base; and
   a moving table being able to be displaced in an XY plane relative to a stationary base, provided that an X-axis, a Y-axis, and a Z-axis are at right angles to each other,
   wherein the X-Y stage apparatus further comprises: a plurality of first elastic hinges having flexible characteristics only in an X-axis direction, and rigid characteristics in a Y-axis direction and a Z-axis direction, and allowing a relative displacement only in the X-axis direction between members connected to both ends of the hinge by being arranged along the Y-axis direction in the XY plane;
   a plurality of second elastic hinges having flexible characteristics only in the Y-axis direction, and rigid characteristics in the X-axis and Z-axis directions, and allowing a relative displacement only in the Y-axis direction between members connected to both ends of the hinge by being arranged along the X-axis direction within the XY plane, and
   an intermediate member interposed within the XY plane in-between the stationary base and the moving table, wherein
   the stationary base, the intermediate member, and the moving table are connected with each other by combined use of the first and the second elastic hinges in such a manner that the moving table to be displaced slightly and the stationary base are arranged at a location including the XY plane, so that the moving table is slightly movable within the XY plane relative to the stationary base, and supported at a prescribed location with regard to the Z-axis direction;
   the X-Y stage apparatus further comprises: an X-axis linear motor having a stator portion and a moving portion arranged on the stationary base and the moving table, respectively, and being able to move the moving table in the X-axis direction relative to the stationary base; and
   a Y-axis linear motor having a stator portion and a moving portion arranged on the stationary base and the moving table, respectively, and being able to move the moving table in the Y-axis direction relative to the stationary base,
   so that the moving table is displaced slightly within the XY plane relative to the stationary base by the X-axis linear motor and Y-axis linear motor.

3. The X-Y stage apparatus according to claim 2, wherein the intermediate member is formed into a rectangular ring-shape having two extended portions in the X-axis direction, and two extended portions in Y-axis direction,
   a relative displacement between the stationary base and the intermediate member in the X-axis direction is allowed by providing the plurality of first elastic hinges arranged in the Y-axis direction between the two extended portions in the X-axis direction of the intermediate member, and the stationary base, and
   a relative displacement between the intermediate member and the moving table in the Y-axis direction is allowed by providing the plurality of second elastic hinges arranged in the X-axis direction between the two extended portions in the Y-axis direction in the intermediate member, and the moving table.

4. The X-Y stage apparatus according to claim 2, wherein
the intermediate member is divided into a plurality of intermediate members including a first intermediate member and a second intermediate member,
the relative displacement of the moving table in the X-axis and Y-axis directions relative to the stationary base is allowed by arranging the first elastic hinge between the stationary base and the first intermediate member to allow the relative displacement between both members in the X-axis direction, and by arranging the second elastic hinge between the first intermediate member and the moving table to allow the relative displacement between both members in the Y-axis direction,
the displacement of the moving table in the X-axis and Y-axis directions relative to the stationary base is allowed by arranging the second elastic hinge between the stationary base and the second intermediate member to allow the relative displacement between both members in the Y-axis direction, and by arranging the first elastic hinge between the second intermediate member and the moving table to allow the relative displacement between both members in the X-axis direction.

5. An X-Y stage apparatus comprising:
a stationary base; and
a moving table being able to be displaced in an XY plane relative to a stationary base, provided that an X-axis, a Y-axis, and a Z-axis are at right angles to each other, wherein
the stationary base is arranged with a prescribed clearance spaced in the Z-axis direction relative to the moving table,
the X-Y stage apparatus further comprises: at least three elastic hinges in a Z-axis direction having rigid characteristics only in its longitudinal direction, and being arranged and interposed in the clearance in the Z-axis direction, for slightly moving the moving table in the XY plane, relative to the stationary base by elastic deformation of the hinges;
an X-axis linear motor having a stator portion and a moving portion arranged on the stationary base and the moving table, respectively, and being able to move the moving table in the X-axis direction relative to the stationary base; and
a Y-axis linear motor having a stator portion and a moving portion arranged on the stationary base and the moving table, respectively, and being able to move the moving table in the Y-axis direction relative to the stationary base,
so that the moving table is displaced slightly within the XY plane relative to the stationary base by the X-axis linear motor and Y-axis linear motor.

6. The X-Y stage apparatus according to claim 5, wherein
the three elastic hinges in the Z-axis direction are positioned at corresponding positions with respective apex locations of a virtual equilateral triangle with the location of the center of gravity of the virtual equilateral triangle coinciding with the center of the gravity of the moving table.

* * * * *